United States Patent [19]

Roode

[11] Patent Number: 4,597,222

[45] Date of Patent: Jul. 1, 1986

[54] SEEDLING TRAY

[76] Inventor: Hermanus B. Roode, 510 Jonathan Str., Waterkloof Glen, Transvaal Province, South Africa

[21] Appl. No.: 655,503

[22] Filed: Sep. 27, 1984

[51] Int. Cl.$^4$ ............................................. A01G 9/02
[52] U.S. Cl. ...................................................... 47/87
[58] Field of Search .................. 47/85, 86, 87, 66, 77, 47/73

[56] References Cited

U.S. PATENT DOCUMENTS

| D. 248,022 | 5/1978 | Makilaakso | 47/87 |
| 3,164,507 | 1/1965 | Masuda | 47/77 |
| 3,667,159 | 6/1972 | Todd | 47/87 |
| 3,810,329 | 5/1974 | Lecruru et al. | 47/87 |

FOREIGN PATENT DOCUMENTS 888854 12/1943 France ................................... 47/86

Primary Examiner—Robert A. Hafer
Assistant Examiner—Bradley M. Lewis
Attorney, Agent, or Firm—Louis E. Marn

[57] ABSTRACT

A seedling tray has intercalating seedling cavities extending oppositely from mouth openings in top and bottom faces of the tray to bottom regions near to the said faces, thereby rendering the tray reversible. Each seedling cavity converges from its mouth opening to its bottom region which as a bottom opening. In use, the seedling tray has a plurality of upwardly open seedling cavities filled with a suitable growing medium such as soil or mulch. Seeds are planted in such medium in each upwardly open cavity. Inverted seedling cavities act as air ventilation passages extending upwardly and are interspersed between the planted seedling cavities. The air ventilation passages intercalate with and are spaced uniformly between the planted seedling cavities. When the seeds have germinated and developed into seedlings, the seedlings may be transplanted as desired.

5 Claims, 9 Drawing Figures

SEEDLING TRAY

BACKGROUND OF THE INVENTION

This invention relates to a seedling tray. It relates in particular to the manufacture of such a tray. Such trays can be used in general nurseries and greenhouses for growing seedlings.

DESCRIPTION OF PRIOR ART

The applicant is aware of seedling trays having seedling planting cavities of rectangular section tapering downwardly from rectangular mouth openings. Such trays are in the form of expanded polystyrene mouldings.

SUMMARY OF THE INVENTION

Accordingly, the invention provides a seedling tray having intercalating seedling cavities extending oppositely from mouth openings in top and bottom faces of the tray to bottom regions near the said faces, thereby rendering the tray reversible.

The cavities may be of generally rectangular, square section, or the cavities may be of generally triangular section. The triangle of the triangular section may be an isosceles or equilateral triangle. The vertices of the triangle may be rounded.

The mouth openings of a pair of adjacent cavities on one side of the tray may be arranged in parallelogram fashion such that when seen in plan view, the opposite sides of the pair of triangles are parallel and form opposing parallel pairs of sides of a parallelogram, a partition between the two adjacent sides of the pair of triangles forming a diagonal of the parallelogram.

Each seedling cavity may converge from its mouth opening to its bottom region. The cavities may have openings in their bottom regions.

A plan view of the seedling tray from one face may represent a complementary image of the plan view of the seedling tray from the opposite face.

When small seedlings are to be cultivated, then small cavities may be used. It may then be possible to obtain close on a total of 300 cavities per tray having dimensions of 700 mm by 350 mm. Where, however, the cavities have to be larger for larger seedlings, then a total of close on 100 cavities may be obtained in a tray of the same overall size. For trays having an equivalent number of cavities, the cavities of the tray according to the invention will be larger than the cavities in the conventional trays known to the applicant.

Furthermore, in conventional seedling trays known to the applicant, the accumulation of moisture in the growing medium or mulch inside the seedling cavities causes difficulties and promotes the growth of plant diseases particularly in humid greenhouse conditions. It then becomes necessary to spray the seedlings with suitable chemicals to prevent losses. This is a costly and time-consuming exercise.

It is a further object of this invention to provide a seedling tray which the applicant believes will reduce these disadvantages.

Accordingly, the invention provides a seedling tray having a plurality of seedling cavities extending downwardly from mouth openings in a top face and air ventilation passages extending upwardly from bottom openings in a bottom face and interspersed between the seedling cavities and having top openings in the top face.

The air ventilation passages may intercalate with and may be spaced uniformly between the seedling cavities.

The top openings of the air ventilation passages may be adjacent the mouth openings of the seedling cavities.

Spare germination cavities may be provided along the edge of at least one of the sides of the tray.

The seedling tray as may be parallelogram shaped in side view.

The seedling tray may be in the form of a moulding of synthetic plastics material. The synthetic plastics material may be polystyrene foam.

The invention will now be described by way of example, with reference to the accompanying diagrammatic drawings.

Figure 1:
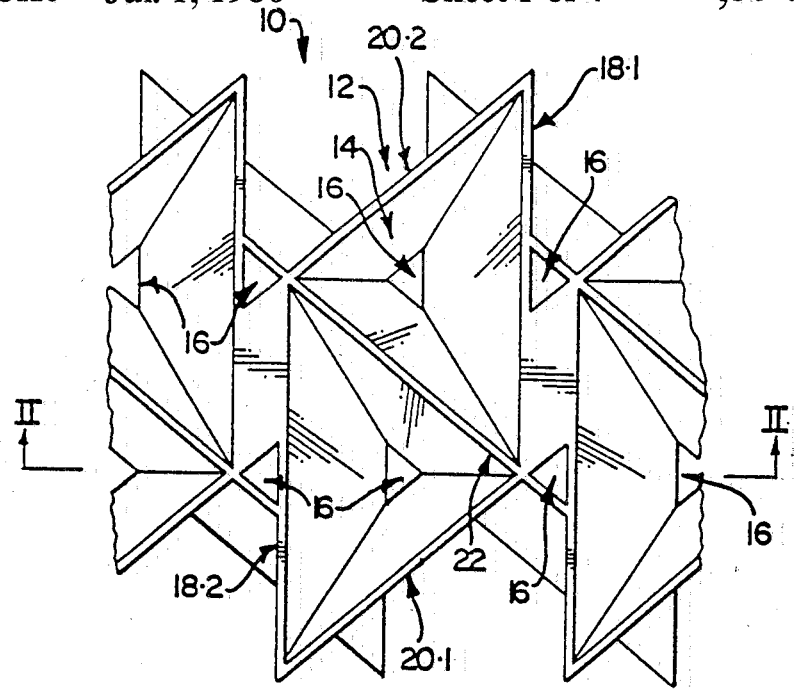
FIG. 1 shows a part plan view of an embodiment of the seedling tray according to the invention.

In the drawings, generally, reference numeral 10 indicates a seedling tray according to the invention.

In the drawings, FIGS. 1 to 8 show seedling trays 10 having intercalating seedling cavities 12 extending oppositely from mouth openings 12.1 in top and bottom faces 10.1 and 10.2 of the tray 10 to bottom regions 12.2 near to the said faces 10.1 and 10.2, thereby rendering the tray reversible.

Figure 3:
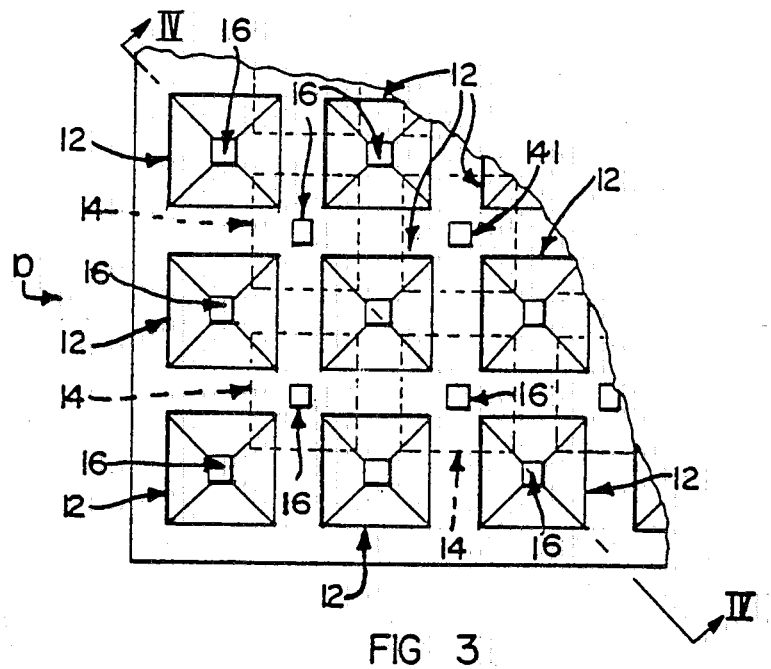
FIG. 3 shows a part plan view of a further embodiment of the seedling tray according to the invention.
Figure 4:
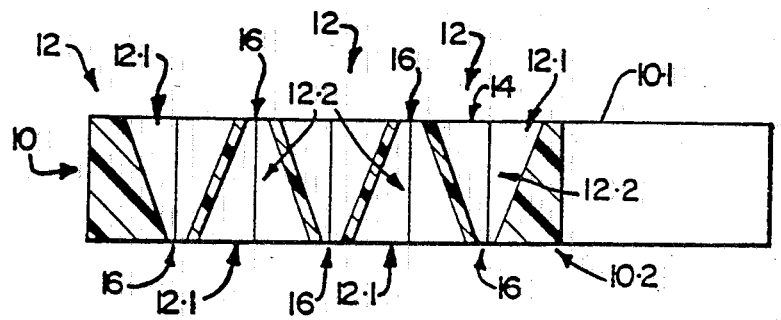
FIG. 4 shows a sectional side view taken at IV—IV in FIG. 3.
Figure 5:
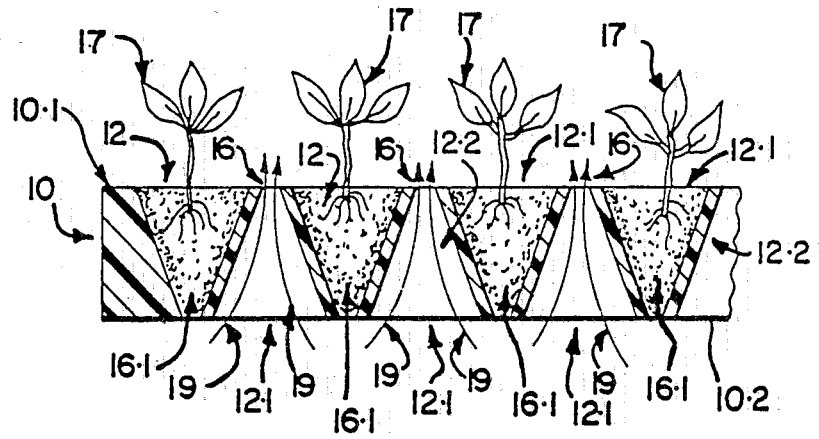
FIG. 5 shows a view similar to FIG. 4, but with seedlings in cavities in the seedling tray.

Referring to FIGS. 3, 4 and 5 of the drawings, the cavities 12 are of generally rectangular section. More particularly, in the latter drawings, the rectangular section is square.

Referring to FIGS. 1, 2, 6, 7 and 8 of the drawings, the cavities 12 are of generally triangular section. The triangle of the triangular section may be an isosceles or an equilateral triangle. More particularly, in the latter drawings, the triangles are isosceles triangles. Referring still more particularly to FIG. 6 of the drawings, the vertices 13 of the triangles are shown rounded.

When the cavities 12 are of triangular section, the mouth openings 12.1 of a pair of adjacent cavities 12 are arranged in parallelogram fashion such that when seen in plan view, the opposite sides 18.1 and 18.2 and 20.1 and 20.2 of a pair of triangles are parallel and form opposing parallel pairs of sides of a parallelogram. A partition 22 between the two adjacent sides of the pair of triangles forms a diagonal of the parallelogram.

Each seedling cavity 12 converges from its mouth opening 12.1 to its bottom region which has a bottom opening 16.

Figure 6:
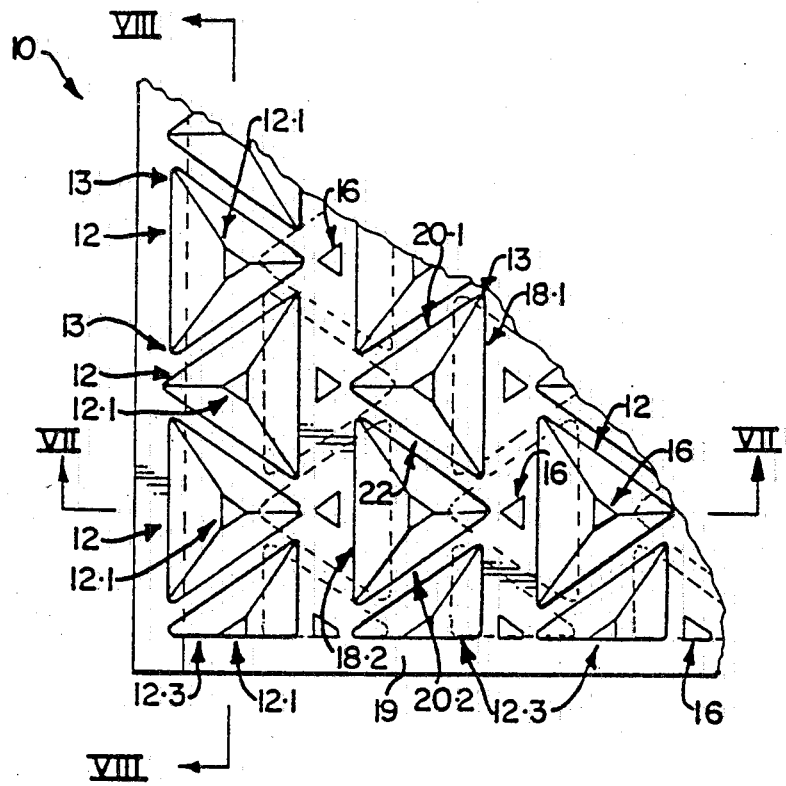
FIG. 6 shows a part plan view of yet a further embodiment of the invention.
Figure 7:
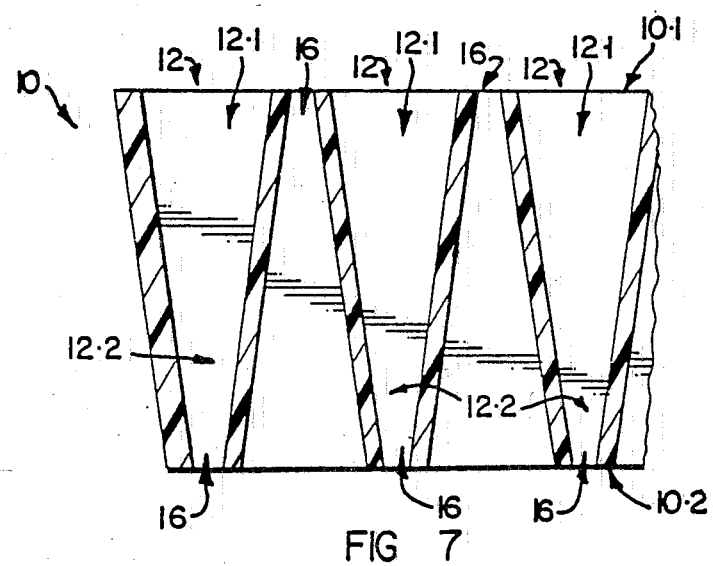
FIG. 7 shows a sectional side view taken at VII—VII in FIG. 6.

Referring to FIGS. 1 and 6 of the drawings, a plan view of the seedling tray from one face 10.1 represents a complementary image of the plan view of the seedling tray from the opposite face 10.2.

Referring to FIGS. 1 to 8 of the drawings, the intercalation of the seedling cavities 12 is illustrated. As a result of the intercalation of the seedling cavities 12, openings 16 of the narrow bottom region of the cavities 12 are adjacent the wide mouth openings 12.1. The intercalating cavities 12 extend from the opposite faces 10.1 and 10.2 of the tray 10, thereby rendering the tray 10 reversible.

In use, the upwardly open seedling cavities on one side of the tray are filled with a suitable seedling growing medium such as soil or mulch 16.1 (FIG. 5). The seeds are planted in such medium in each upwardly open cavity. When the seeds have germinated and developed into seedlings 17, they are transplanted as desired.

Referring to FIG. 6 of the drawings, in one embodiment of the invention, spare germination cavities 12.3 are provided along the edge of one side of the tray 10. Should seeds planted in some of the seedling cavities 12 fail to germinate, these seedling cavities may be filled with seedlings which have germinated in the spare germination cavities 12.3.

The accumulation of moisture in the growing medium or mulch 16.1 inside the seedling cavities 12 can cause difficulties and can promote the growth of plant diseases particularly in humid greenhouse conditions. It then becomes necessary to spray the seedlings with suitable chemicals to prevent losses.

Accordingly, a seedling tray 10 in use, has a plurality of planted seedling cavities 12 and inverted seedling cavities 12 acting as air ventilation passages extending upwardly and interspersed between the planted seedling cavities 12. The air ventilation passages intercalate with and are spaced uniformly between the planted seedling cavities 12. The top openings 16 of the air ventilation 12 in face 10.1 passages are adjacent the mouth openings 12.1 of the seedling cavities 12 in the top face 10.1. The tray 10 is in use supported so that the bottom face 10.2 and bottom mouth openings 12.1 are clear of obstruction, to permit airflow upwardly in the direction of arrows 19.

In use, during the day, air flows through the air ventilation passages in the direction of arrows 19. Flow of air prevents stagnant humid zones around the seedlings and promotes the evaporation of excess moisture from the mulch 16. Thus the need to spray the seedlings 17 with chemicals to prevent disease may largely be avoided. The flow of air also promotes carbon dioxide enrichment and aeration of the seedlings.

Figure 2:
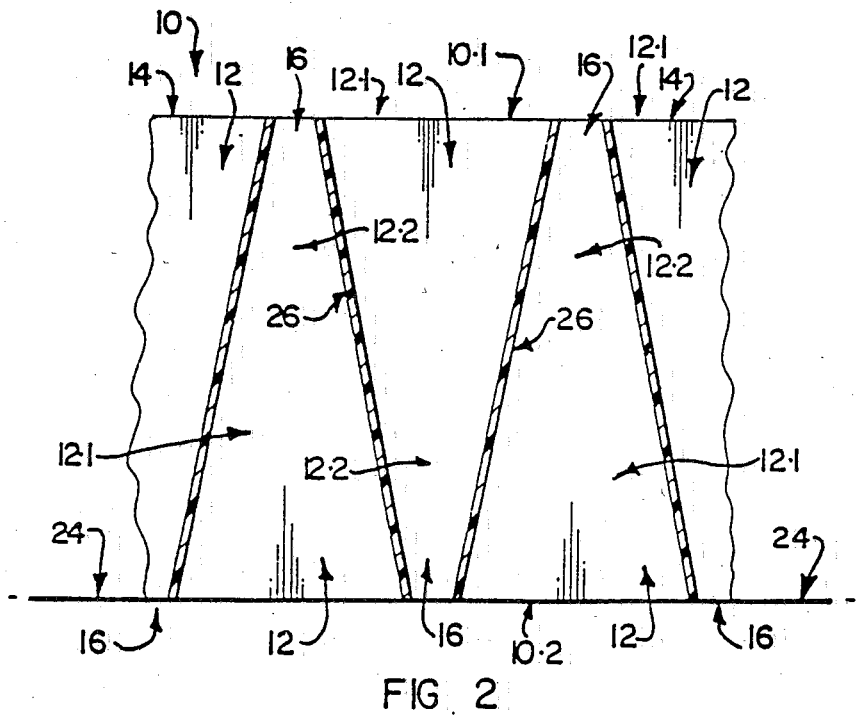
FIG. 2 shows a sectional side view taken at II—II in FIG. 1.

Referring to FIGS. 2 and 5 of the drawings, if desired, the bottom of the tray may be allowed to rest on a heating surface 24 to promote early germination and growth. The empty downwardly facing seedling cavities form air pockets. The air in the air pockets is heated by heating surface 24. Heat is conducted through sides 26 to the cavities 12 to the seedling growing medium or mulch 16 contained in the filled upwardly open cavities 12. Thus early germination of the seeds and growth of the seedlings planted in the upwardly open filled cavities can be promoted. After germination has taken place, then the tray 10 may be supported so that face 10.2 is clear of obstruction, thereby to promote the flow of air in the direction of arrows 19.

After use, the soiled cavities may be washed and the tray reversed to provide upwardly open cavities from the other side of the tray. These cavities are then filled with seedling growing medium and further seeds planted. The downwardly facing empty cavities on the reverse side of the tray can then dry out.

Figure 8:
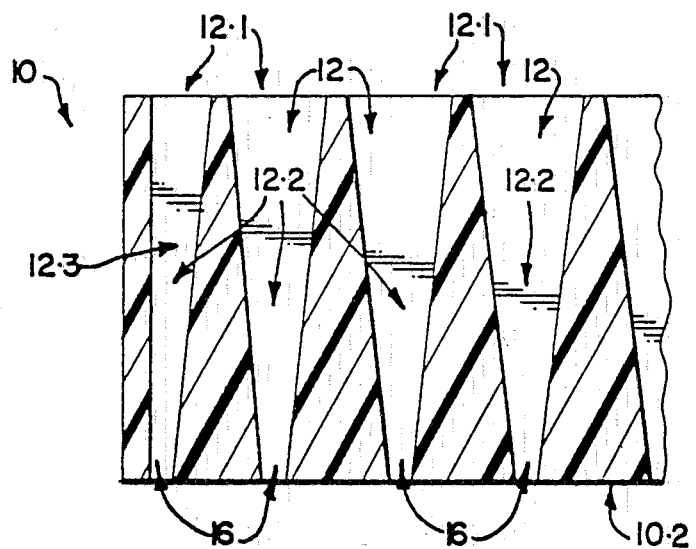
FIG. 8 shows a sectional end view taken at VIII—VIII in FIG. 6.

As shown in FIGS. 6 and 8 of the drawings, spare germination cavities 12.3 are provided along the edge 21 of the sides of the tray 10. The spare germination cavities 12.3 are smaller than the seedling cavities 12 and also serve to optimize use of the available surface area of the tray 10, and result in a saving in manufacturing material.

The seedling tray 10 is in the form of an injection moulded block of polystyrene foam.

Figure 9:
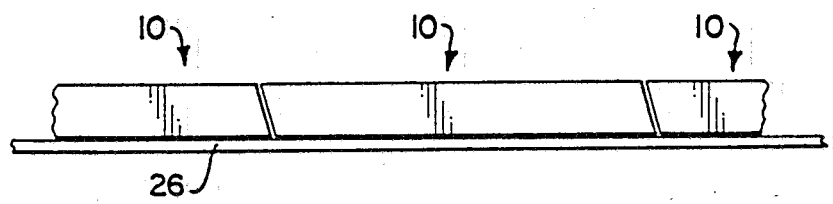
FIG. 9 shows a fragmented side view of seedling trays according to the invention when packed in series on a nursery shelf.

As shown in FIG. 9 of the drawings, the seedling trays 10 are parallelogram shaped in side view. This results in a further saving in manufacturing materials, and, when packed in series on a nursery shelf 26, the trays wedge in against each other thus reducing the possibility of upward displacement by e.g. wind.

It is an advantage of the invention that it provides a durable, reversible, ventilated seedling tray having a larger number of seedling cavities per tray than conventional seedling trays known to the Applicant.

What is claimed is:

1. A seedling tray having spaced parallel opposed faces, and which has a multiple of intercalating seedling cavities of generally triangular section arranged in successive rows across the tray, the cavities of adjacent rows tapering oppositely from large triangular-shaped mouth openings in both of the said opposed faces of the tray to small triangular-shaped bottom openings for the cavities in the said opposed faces, thereby rendering the tray reversible, and in which the cavities are arranged in such a way that when two successive rows are seen in side elevation, a side wall of a cavity which converges away from one of the said faces overhangs an adjacent cavity in the adjacent row the said adjacent cavity converging away from the other of the said faces.

2. A seedling tray having spaced parallel opposed faces, and which has a multiple of intercalating seedling cavities of generally triangular section arranged in successive rows across the tray, the cavities of adjacent rows tapering oppositely from large triangular-shaped mouth openings in both of the said opposed faces of the tray to small triangular-shaped bottom openings for the cavities in the said opposed faces, thereby rendering the tray reversible, and in which the cavities are arranged in such a way that an apex of a triangular mouth opening in one of the said faces of the cavity in a row is aligned in the same face and in a direction transverse to the row with the apex of an adjacent triangular bottom opening of an adjacent cavity in an adjacent row.

3. A seedling tray as claimed in claim 2, in which the spacing between the said apeces in the said face is less than the width of side of the said bottom opening in the said face.

4. A seedling tray having spaced parallel opposed faces, and which has a multiple of intercalating seedling cavities of generally triangular section arranged in successive rows across the tray, the cavities of adjacent rows tapering oppositely from large triangular-shaped mouth openings in both of the said opposed faces of the tray to small triangular-shaped bottom openings for the cavities in the said opposed faces, thereby rendering the tray reversible, and in which the minimum spacing on either one of the said two opposed faces between the sides defining the mouth opening of a cavity in one row and the sides defining the adjacent bottom openings of adjacent oppositely tapering cavities in adjacent rows, is less than the width of side of a bottom opening.

5. A seedling tray having spaced parallel opposed faces, and which has a multiple of intercalating seedling cavities of generally triangular section arranged in successive rows across the tray, the cavities of adjacent rows tapering oppositely from large triangular-shaped mouth openings in both of the said opposed faces of the tray to small triangular-shaped bottom openings for the cavities in the said opposed faces, thereby rendering the tray reversable, and in which the sides separating adjacent oppositely tapering cavities in adjacent rows has a thickness which is uniform throughout its length when seen in sectional side elevation.

* * * * *